United States Patent [19]
Baker

[11] Patent Number: 5,365,548
[45] Date of Patent: Nov. 15, 1994

[54] DIGITAL FSK TRANSMITTER

[75] Inventor: William E. Baker, Mentor, Ohio

[73] Assignee: Elsag International B. V.

[21] Appl. No.: 32,938

[22] Filed: Mar. 17, 1993

Related U.S. Application Data

[62] Division of Ser. No. 752,758, Aug. 30, 1991, Pat. No. 5,311,556.

[51] Int. Cl.⁵ .............................................. H04L 27/10
[52] U.S. Cl. ...................................... 375/62; 375/45; 331/179; 332/101; 377/64
[58] Field of Search ................................... 375/45–46, 375/48, 62, 64; 332/100–102; 331/179; 377/54, 59, 64

[56] References Cited

U.S. PATENT DOCUMENTS

| | | | |
|---|---|---|---|
| 3,597,599 | 8/1971 | William | 375/62 |
| 4,349,887 | 9/1982 | Crowley | 375/62 |
| 4,757,519 | 7/1988 | Collison et al. | 375/62 |

Primary Examiner—Stephen Chin
Assistant Examiner—Young Tse
Attorney, Agent, or Firm—Vytas R. Matas

[57] ABSTRACT

A digital FSK transmitter utilizing a clock feedback signal driving an accumulator to operate a pair of registers having a pair of preset numbers stored therein to selectively add said numbers through a binary adder to the accumulator to output the FSK signal thereby.

6 Claims, 7 Drawing Sheets

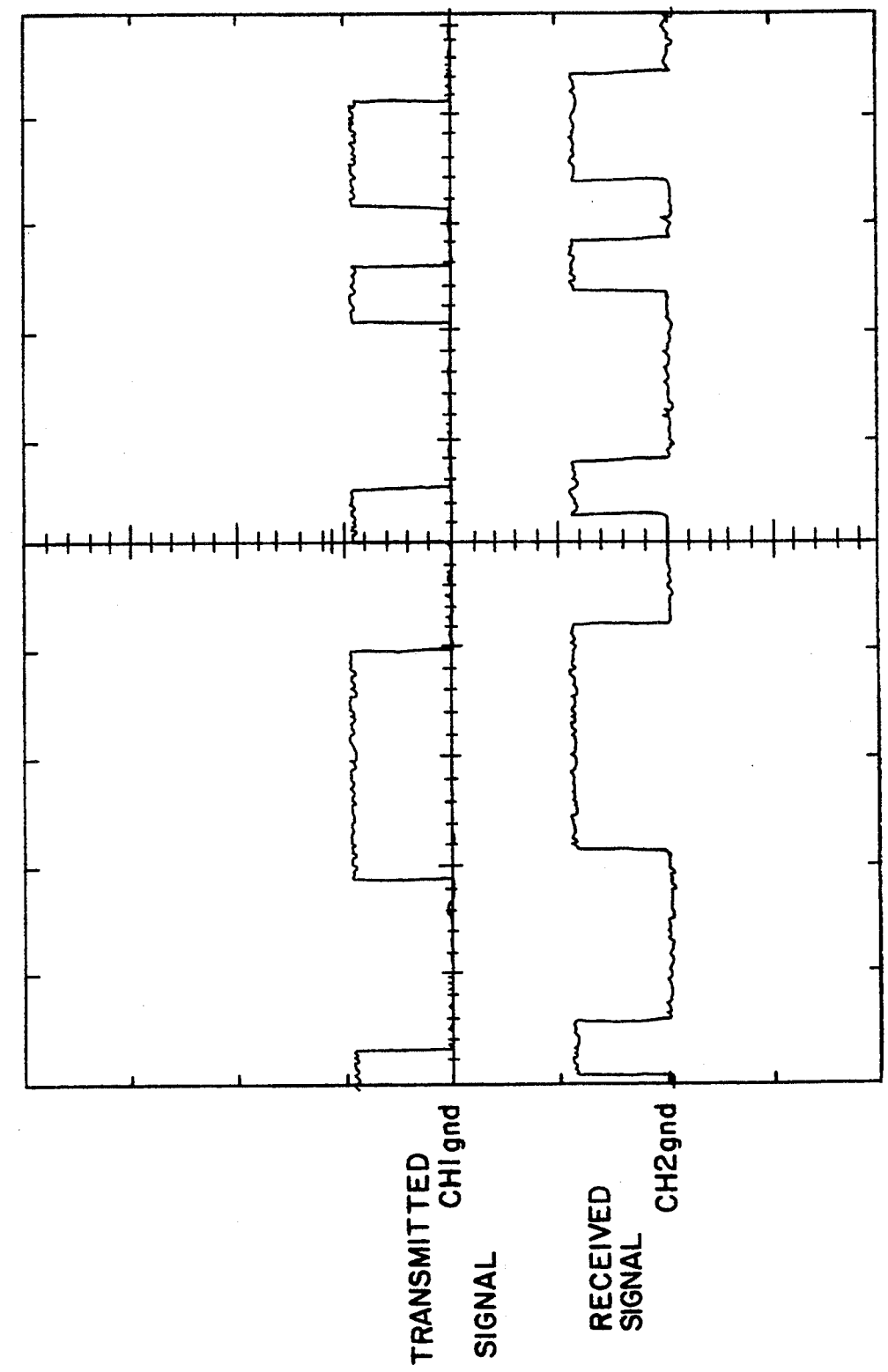

DIGITAL FSK TRANSMITTER

This is a continuation a division of application Ser. No. 7/752,758 filed Aug. 30, 1991, now U.S. Pat. No. 5,311,556.

FIELD AND BACKGROUND OF THE INVENTION

The present invention relates in general to frequency-shift keying (FSK) transmitters and receivers, and in particular to a new and useful digital FSK transmitter and receiver and method of operating same.

Frequency-shift keying is a form of frequency modulation used especially in telegraph and facsimile transmission. The modulating wave in frequency-shift keying shifts the output frequency between predetermined values corresponding to the frequencies of correlated sources.

Digital FSK transmitters are known. A digital phase locked loop which can be used as a component of an FSK receiver is also known, but this circuit requires the use of an analog filter to operate as an FSK receiver.

The inventor is not aware of any known instance of a digital FSK transmitter receiver. A digital FSK transmitter receiver would have several advantages over known analog FSK receivers. A digital FSK receiver would allow the use of a gate array rather than a mixed-mode ASIC (Application Specific Integrated Circuit). A gate array implementation is cheaper to develop, requires less turn-around time, and reduces the per part price to less than half that of a mixed-mode ASIC. A digital FSK receiver would also not require a filter which is necessary in analog FSK receivers. This would reduce board area required for the equipment by a factor of two.

SUMMARY OF THE INVENTION

The digital FSK transmitter receiver of the present invention utilizes information contained in the zero crossings of the received FSK digital signal. The digital FSK signal is transmitted by a dual register preprogrammed to add a predetermined count to an accumulator through an adder to generate the exact dual FSK frequencies required. The same clock signal used for the accumulator is also used as a signal for the dual registers by way of the signal going to the single stage shift register.

The zero crossings of the transmitted FSK signals are converted to a digital format by counting the number of clock pulses between successive zero crossings. A second clock is used to insert the last zero crossing count into a multistage FIFO (first in-first out buffer). An accumulator stores the sum of the values in the FIFO. A threshold is established whereby any value in the accumulator below the threshold is considered a zero and any value above is considered a one.

The accumulator and the FIFO serve as a "digital" filter. If a zero crossing is received early (or late) as a result of noise, the value in the accumulator will decrease (or increase). However, if the next zero crossing is not displaced, it will bring the accumulator back to its expected value.

Extensive computer simulations have demonstrated the utility of the present invention.

Thus an object of the present invention is to provide an FSK transmitter utilizing a clock feedback signal to generate the FSK frequencies from the accumulator.

Another object of the present invention is to provide a digital FSK receiver for receiving an FSK signal containing at least two different signal frequencies, comprising: a zero crossing detector for detecting zero crossings of the FSK signal; interval measuring means connected to the zero crossing detector for measuring the intervals between the zero crossings; a buffer for storing a number of previous zero crossing values; an accumulator for maintaining the sum of the stored zero crossing values (with a possible fixed offset); and a binary output means for outputting a one or a zero depending on whether the value in the accumulator is above or below a selected threshold.

A further object of the present invention is to provide a method of digitally receiving an FSK signal by detecting the intervals between zero crossings in the signal to generate either a zero or a one in a binary output.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 7 graphically illustrates the transmitted and received FSK signals for two operating chips embodying the present invention.

DESCRIPTION OF THE PREFERRED EMBODIMENT

Figure 1:
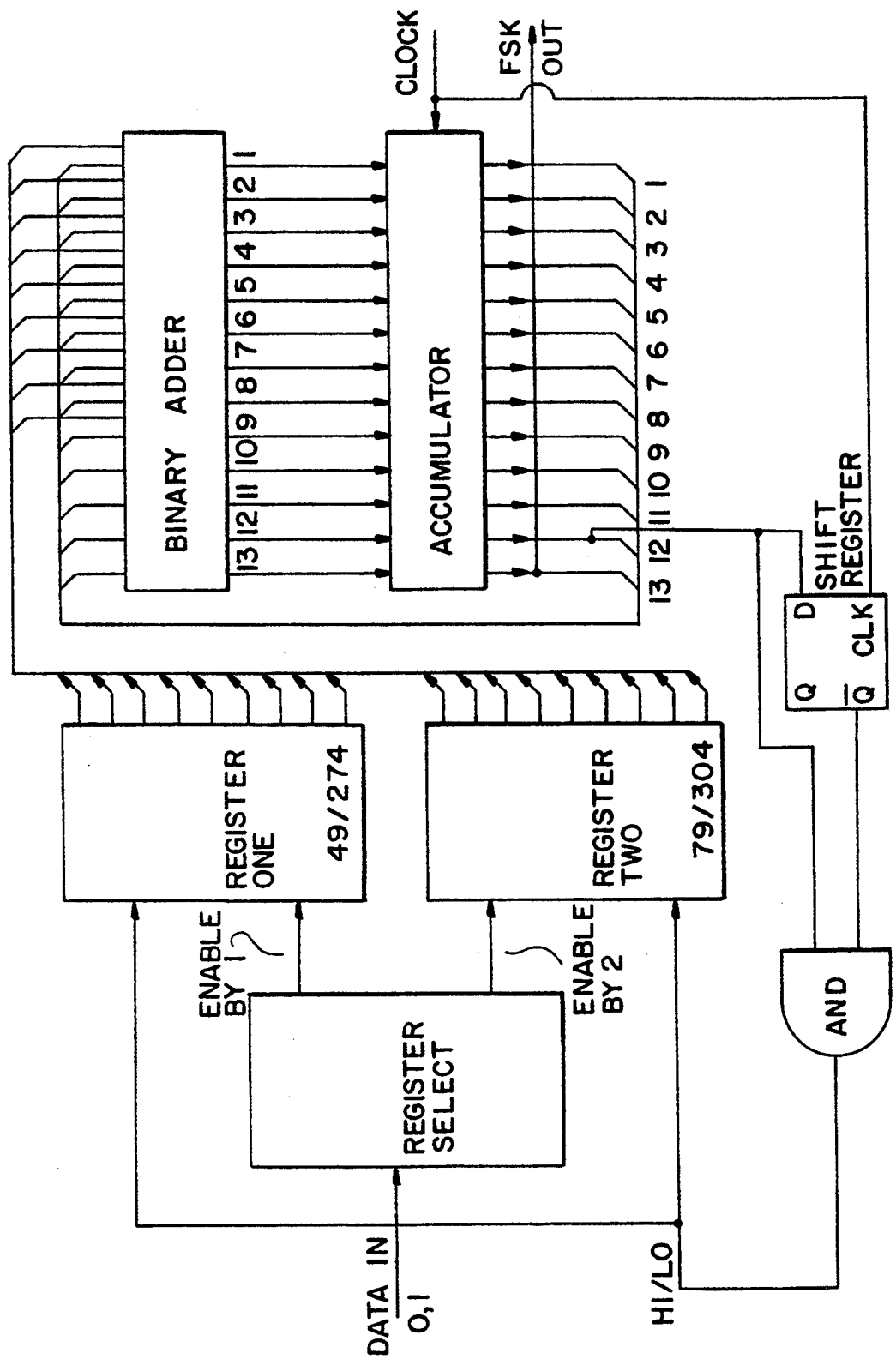
FIG. 1 is a block diagram showing a digital FSK transmitter which can be used to generate a binary FSK signal.

A digital FSK transmitter is Illustrated in FIG. 1. The transmitter consists of a thirteen stage accumulator, a thirteen stage adder and means for adding a number to the accumulator at a 3 MHz rate as determined by the CLOCK used for the accumulator. With a fixed number, N, the thirteenth stage would alternate between a one and a zero with an average frequency being outputted at the FSK OUT determined by the formula:

$$, \text{freq }(N) \text{ ave} = (3{,}000{,}000 * N)/8192$$

where:
    freq(N) ave = average FSK frequency
    3,000,000 = CLOCK frequency 3 MHz
    N = number added to the accumulator $8192 = 2^{13}$ as determined by the 13 stages of the accumulator, each stage having 2 values This is specified as an average frequency because, if N Is not a factor of 8192 (2**13th=8192), the frequency generated will shift between two frequencies such that the average Is that defined above. In FSK transmission the actual frequency is important rather than the average.

In our embodiment we want to generate FSK frequencies of 19 KHz and 30.5 KHz. With a 3 MHz clock, the half period of the frequency generated must be a multiple of 333+n seconds (the period is the reciprocal of the frequency). The best we can do in generating these desired frequencies is to divide the 3 MHz generated by the clock by the divisors 158 and 98, giving us 18.987 KHz and 30.612 KHz respectively. To eliminate the averaging problem stated above we want the accumulator maximum value divisible by both 158 and 98. The largest number, less than 8192, which is divisible by both 158 and 98 is 7742. This number is 450 short of the full accumulator of 8192. It is essential that the output maintain a 50% duty cycle and so a convenient way of obtaining the desired count is to add 225 of 50% of 450 to the accumulator each half cycle. In the block diagram shown in FIG. 1, this is accomplished by having registers one and two normally add 79 or 49 to the accumulator (50% of 158 and 98 respectively) and once each half cycle the next 49 or 79 number is changed to 304 or 274 respectively to provide the 225 addition every half cycle. Note that 225 added to 79 and 49 respectively yields 304 and 274.

In operation the DATA IN signal to the register select is binary in nature (0, 1) and corresponds to the frequency output desired from the FSK OUT of the accumulator. The register select thus enables only register one for an input signal of 1 and enables only register two for an input signal of 0. The enabled register is thus activated to pass either of the two numbers stored therein to the binary adder. Register one has the numbers 49 and 274 stored therein while register two has the numbers 79 and 304 stored therein. The enabled register will transmit either the higher or lower of the two numbers depending on whether it receives a HI or LO signal on the HI/LO input line.

The HI/LO signal is derived from the output of an AND gate having inputs derived from the output of the 12th stage of the accumulator and the output, $\overline{Q}$, of a shift register which has input D from the 12th stage of the accumulator and is clocked by the 3 MHz CLOCK. Thus the output of the shift register Q is the accumulator 12th stage delayed by one clock cycle of the 3 MHz clock input CLK.

Thus the AND gate will generate a LO signal for all but one clock cycle of each half cycle of FSK OUT. Recall that we want to divide the 3 MHz clock by 158 or 98, depending on the data input. If we have an input of one, we are adding 49 156 times and 274 twice for each cycle of FSK OUT and 49*156+2*274=8192. If we have an input of zero, we are adding 79 96 times and 304 2 times and 79*96+2*304=8192.

The LO numbers transmitted from the registers are due to the inputs to the AND gate being opposite in sign except when the 12th stage of the accumulator changes from a 0 to a 1 indicating the need for adding the previously mentioned number 225 which is added to the next normally transmitted number, either 49 or 79, to make for a single transmission of either 274 or 304 from the 13th stage of the accumulator depending on whether register one or register two of the accumulator is enabled.

Figure 2:
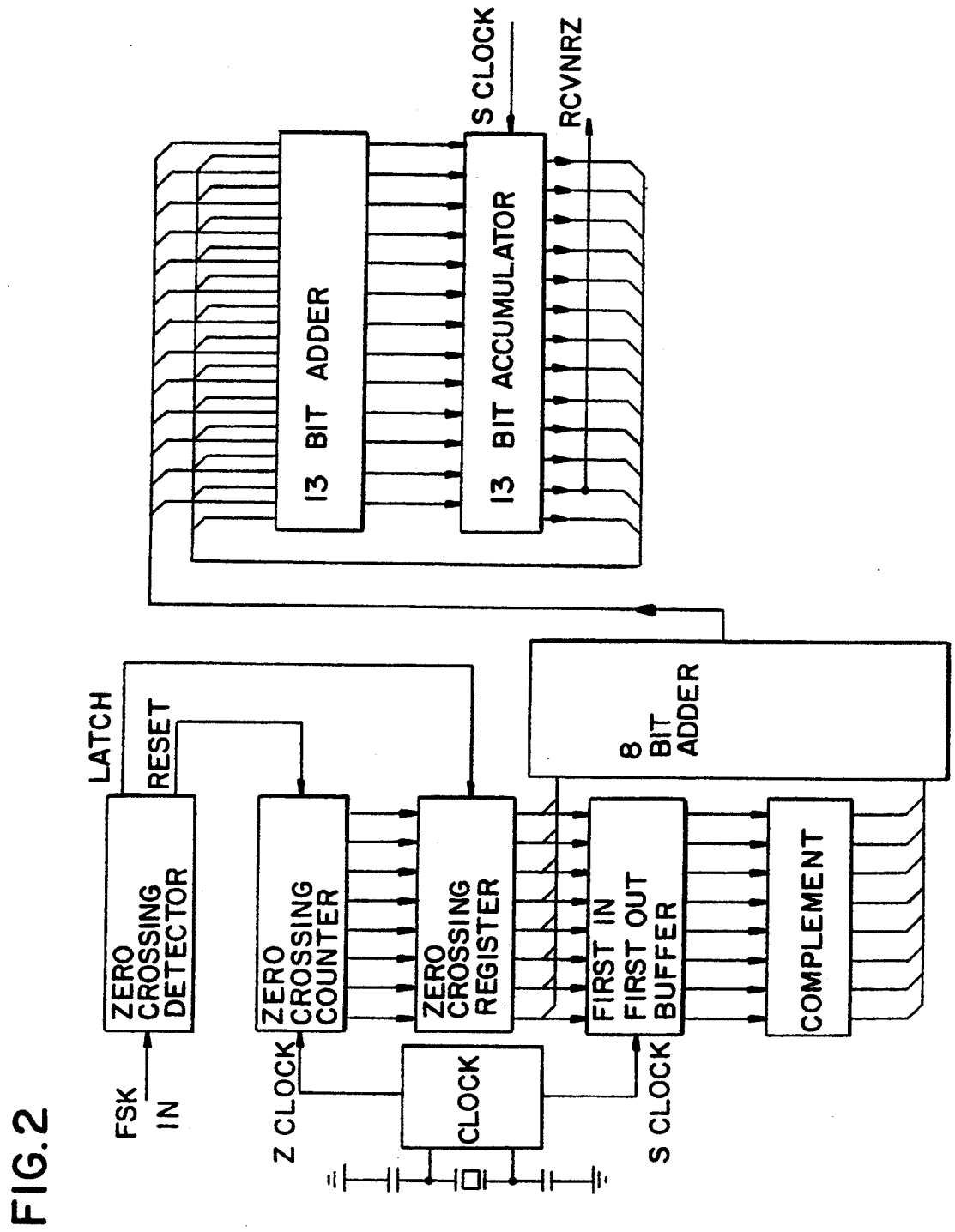
FIG. 2 is a block diagram of the digital FSK receiver of the present invention.

FIG. 2 illustrates the digital FSK receiver of the present invention. It has been designed so as to use most of the circuitry in the FSK transmitter shown in FIG. 1. In FIG. 2, intervals between zero crossings are converted to numbers by counting the pulses of a clock, labelled ZCLOCK, in a counter. At each zero crossing the count resulting from the previous interval is stored in a register. On each pulse of clock SCLOCK the value of the register is inserted in a 16 deep, 8 bit wide FIFO (first in first out) buffer. An accumulator stores the sum of the values in the FIFO (plus a fixed offset). Rather than sum the 16 values each time, the accumulator is kept current by subtracting the oldest value in the FIFO from the new value being inserted and adding the resultant to the accumulator.

If the received signal were a continuous zero (30.5 KHz), it would have zero crossing intervals of 16.393 microseconds. A continuous one (19 KHz) would have zero crossing intervals of 26.316 microseconds. With a ZCLOCK of 6 MHz these intervals would yield counts of 98 and 158 respectively. Thus a continuous 0 input would give a value for the sum of the FIFO of 1568 and a continuous 1 input would give a value of 2528. The mid-point is 2048, or 211th. As seen in FIG. 2, the baseband output is the 12th stage of the accumulator (a one in the 12th stage has a value of 211th).

When the transmitted data changes from 1 to 0 (or 0 to 1) there will be one zero crossing interval which will be between the two extremes. This intermediate count contains information which allows the receiver to determine where within the interval the change occurred. It is imperative for minimum jitter reception that this intermediate value be retained.

In the present embodiment, the SCLOCK is 250 KHz and, because the 13 stage adder is relatively slow, it is not practical to subtract the old value of the buffer between successive SCLOCKs. Instead, an 8 bit adder calculates the difference between the new and the old values of the FIFO and this result is added to the accumulator at the SCLOCK rate. It is important to note that the result to be added to the accumulator may be positive or negative. A negative number from the 8 bit adder is automatically expressed in two's complement form and so adding it to the accumulator will give the correct result.

The receiver of the present invention bas been simulated using several BASIC programs. Calculations were performed to determine the spacings of zero crossings which would result from a perfect FSK transmitter being modulated by an input data stream. Delays were investigated for one to zero transitions and for zero to one transitions and the phase of the input data stream to the FSK signal was varied over all the possible values in increments of 1 microsecond.

Figure 3:
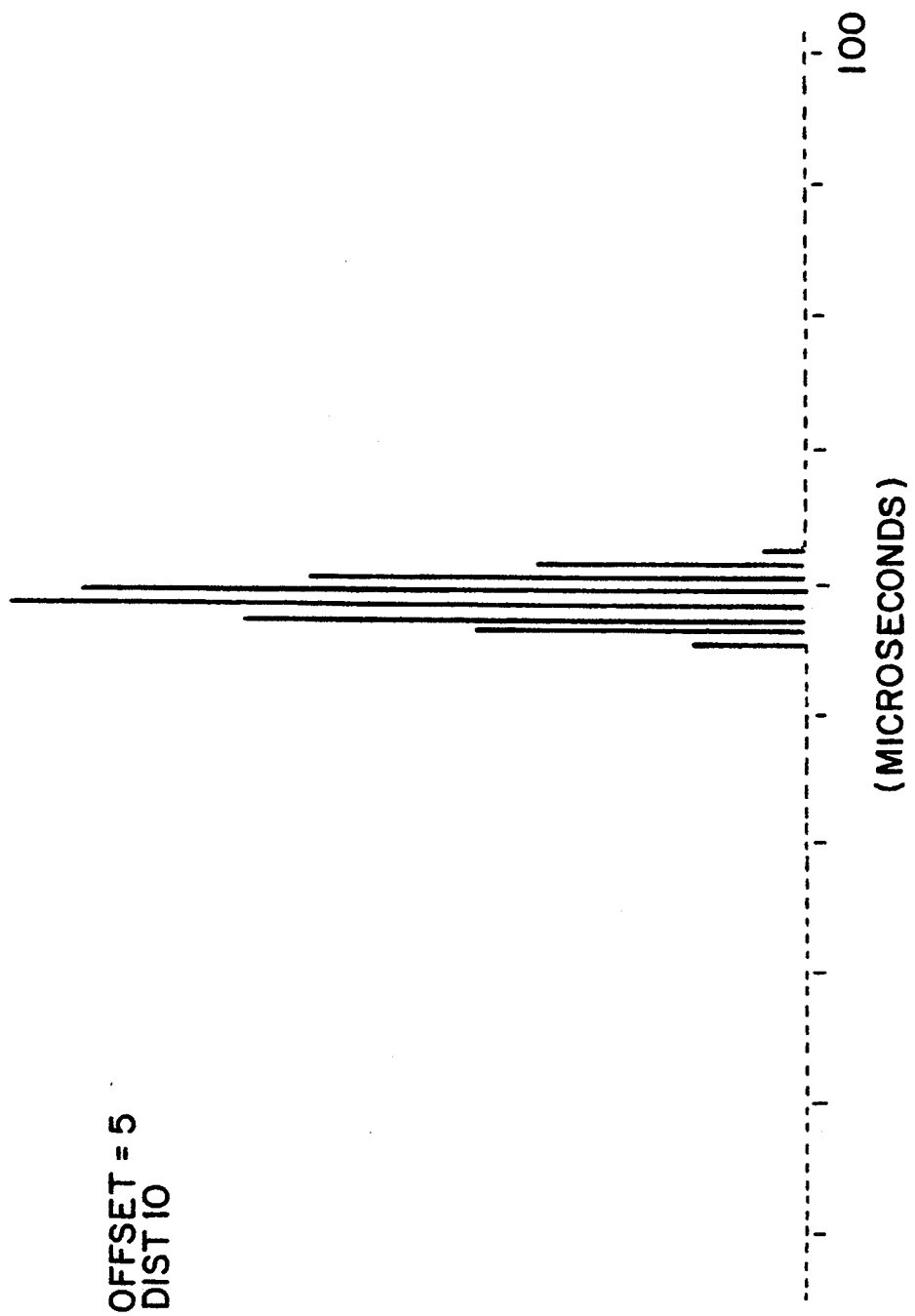
FIG. 3 is a graph plotting a signal against time and illustrating a delay distribution resulting from one simulation of the present invention.

In the first program, the delay in the change of the output relative to a change in the input data stream from a one to a zero, was investigated. The time t=0, was arbitrarily set to the last zero crossing before the input data changed. The program was run a number of times for the input changing at t=1 microseconds, 2 microseconds, up to 26 microseconds. The limit is 26 microseconds because, if it were any later than that, another zero crossing would occur before the input change. FIG. 3 shows the distribution of the delays (time of output change minus time of input change). The actual values are given in Table 1, and the program is listed in Table 2.

Figure 4:
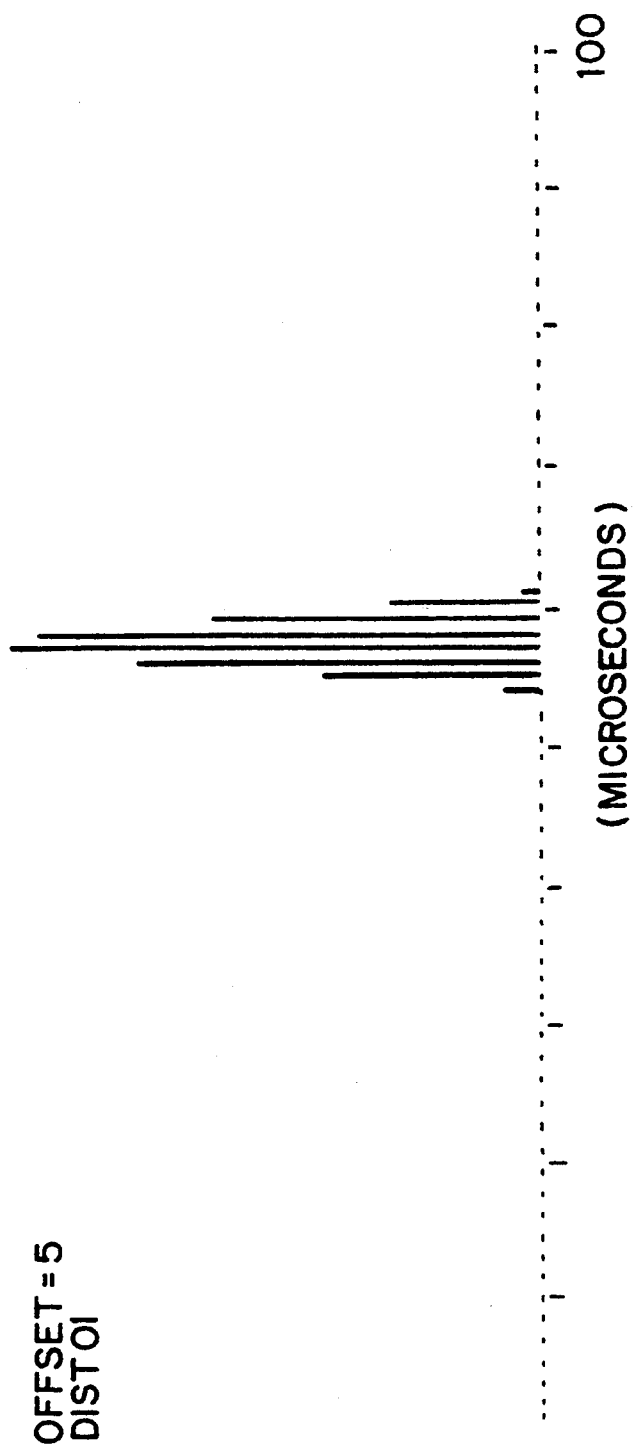
FIG. 4 is a view similar to FIG. 3 illustrating a delay distribution of a different simulation of the invention.

Similarly, the delay due to a change from a zero to a one was investigated. The distribution is shown in FIG. 4, the values are listed in Table 3, and the program is given in Table 4.

When the programs were originally run, the distribution for both cases was about ±3.5%, but the average delays were different. This would result in a bias, causing ones and zeros not to have the same duration. The simplest way to counteract this bias is to offset the value stored in the accumulator, i.e., Accumulator Value=-Sum of FIFO+$N_{COR}$ where $N_{COR}$ is a positive or negative integer.

A third program was run to demonstrate the circuit's response to a random input. The plot of the accumulator value compared to tile input waveform is shown in FIG. 5.

Figure 5:
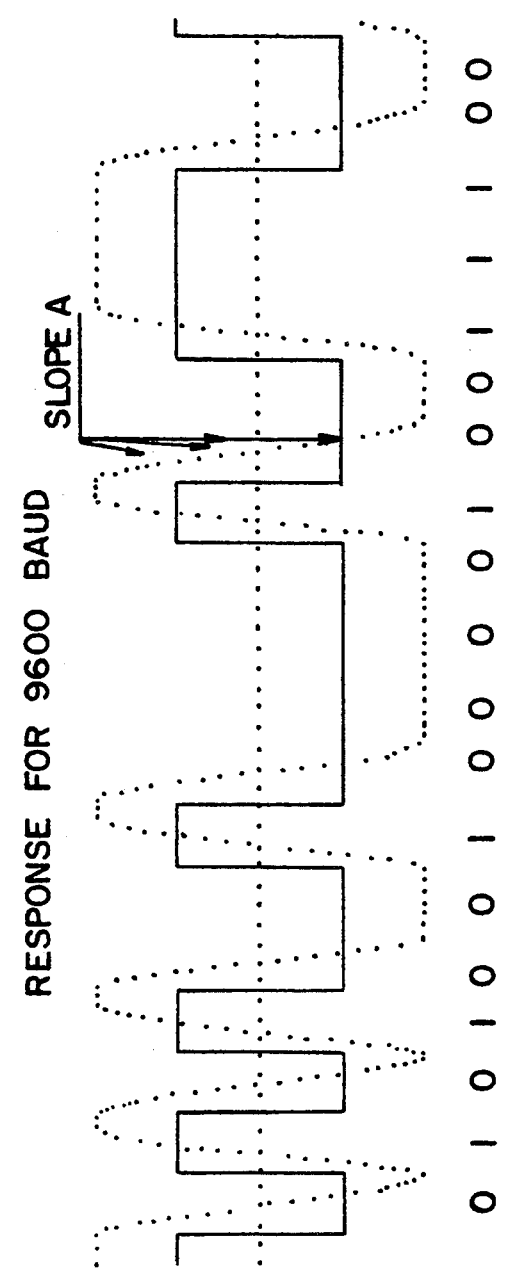
FIG. 5 illustrates a waveform showing the correlation between a signal fed into an FSK transmitter and the corresponding value in an accumulator of an FSK receiver which is receiving the output of the above transmission.

In FIG. 5, tile solid line waveform is the data input to an FSK transmitter. The ones and zeroes below the waveform show the data to be transmitted to a distant receiver. The dotted line waveform is the value in the accumulator of the distant receiver. As can be seen in FIG. 5, the dotted line waveform has a number of changes in slope which will be described in more detail below.

Figure 5A:
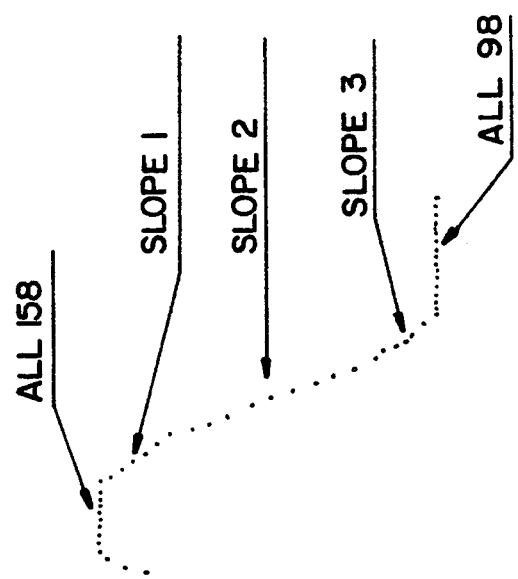
FIG. 5A is a section of the waveform shown in FIG. 5, with an expanded time scale to better illustrate the different slopes of the waveform.

The upper flat portions of the dotted line waveform indicate that the FIFO contains 16 values of 158. The lower flat portions of the dotted line waveform indicate that the FIFO contains 16 values of 98. The slopes which connect the upper and lower portions are a function of when the change from a one to a zero or a zero to a one has occurred. If the data transition occurs at a zero crossing there will be a single slope. If the transition occurs between zero crossings an intermediate count will be stored in the FIFO and three different slopes will occur as shown at slope A, which is a transition between a received one and a received zero, in the dotted line waveform. An enlargement of the slopes of A is shown in FIG. 5A.

Figure 6:
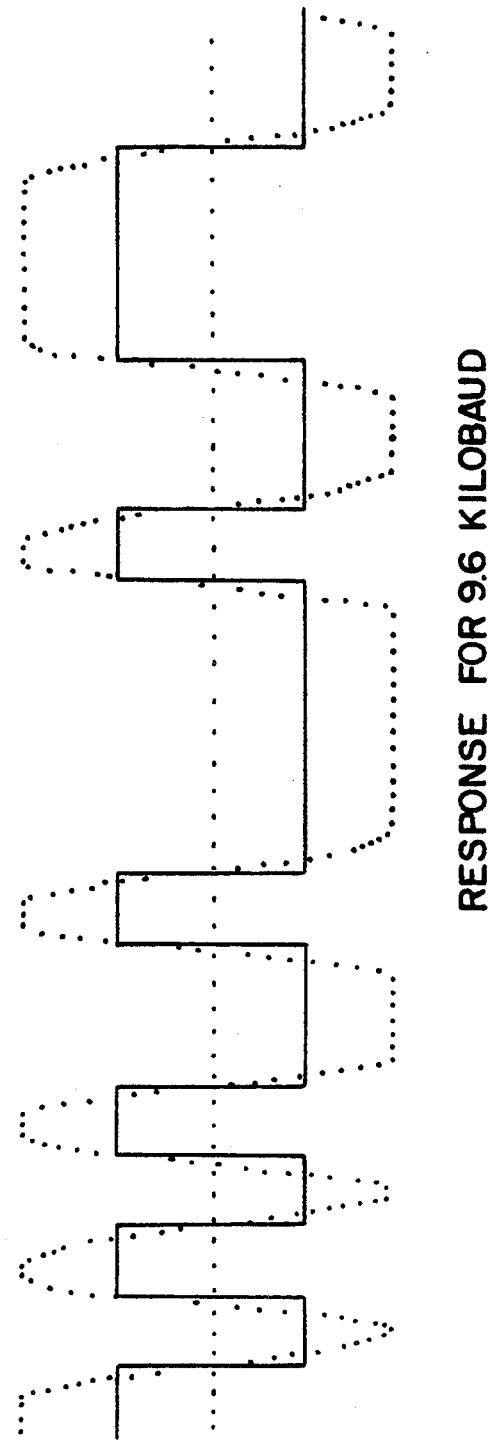
FIG. 6 is a view similar to FIG. 5 with the FSK transmitter input artificially delayed to better illustrate the correlation between the waveforms.

Just prior to the first slope in A, one is being received and 158 is being shifted in an out of the FIFO. Slope 1 of A occurs because 158 is being shifted out of the FIFO but a value less than 158 (and greater than 98) is being shifted in. Slope 2 occurs because 98 is being shifted into the FIFO and 158 is being shifted out. Slope 3 occurs when the intermediate values are shifted out of the FIFO and 98 is being shifted in. When all of the intermediate values are shifted out of the FIFO, the FIFO is loaded with all 98s and the waveform is at the lower flat portion. To make it easier to compare the two waveforms, they are shown in FIG. 6 with input delayed. In both plots, the dotted line is set at the count 2048. The program is listed in Table 5.

A basic design for an all-digital FSK circuit has been disclosed. Without any enhancements, it is likely that the design would satisfy all basic requirements.

FIG. 7 shows the actual results achieved in a gate array chip constructed according to the present invention. FIG. 7 illustrates the delay between the transmitted signal CH1 and the received signal CH2.

While a specific embodiment of the invention has been shown and described in detail to illustrate the application of the principles of the invention, it will be understood that the invention may be embodied otherwise without departing from such principles.

TABLE 1

|     |     |     |     |     |     |
|-----|-----|-----|-----|-----|-----|
| 0:  | 0   | 0   | 0   | 0   | 0   |
| 5:  | 0   | 0   | 0   | 0   | 0   |
| 10: | 0   | 0   | 0   | 0   | 0   |
| 15: | 0   | 0   | 0   | 0   | 0   |
| 20: | 0   | 0   | 0   | 0   | 0   |
| 25: | 0   | 0   | 0   | 0   | 0   |
| 30: | 0   | 0   | 0   | 0   | 0   |
| 35: | 0   | 0   | 0   | 0   | 0   |
| 40: | 0   | 0   | 0   | 0   | 0   |
| 45: | 0   | 0   | 0   | 0   | 0   |
| 50: | 0   | 0   | 0   | 0   | 37  |
| 55: | 111 | 188 | 264 | 240 | 166 |
| 60: | 88  | 13  | 0   | 0   | 0   |
| 65: | 0   | 0   | 0   | 0   | 0   |
| 70: | 0   | 0   | 0   | 0   | 0   |
| 75: | 0   | 0   | 0   | 0   | 0   |
| 80: | 0   | 0   | 0   | 0   | 0   |
| 85: | 0   | 0   | 0   | 0   | 0   |
| 90: | 0   | 0   | 0   | 0   | 0   |
| 95: | 0   | 0   | 0   | 0   | 0   |

TABLE 3

|     |     |     |     |     |     |
|-----|-----|-----|-----|-----|-----|
| 0:  | 0   | 0   | 0   | 0   | 0   |
| 5:  | 0   | 0   | 0   | 0   | 0   |
| 10: | 0   | 0   | 0   | 0   | 0   |
| 15: | 0   | 0   | 0   | 0   | 0   |
| 20: | 0   | 0   | 0   | 0   | 0   |
| 25: | 0   | 0   | 0   | 0   | 0   |
| 30: | 0   | 0   | 0   | 0   | 0   |
| 35: | 0   | 0   | 0   | 0   | 0   |
| 40: | 0   | 0   | 0   | 0   | 0   |
| 45: | 0   | 0   | 0   | 0   | 0   |
| 50: | 0   | 0   | 0   | 12  | 69  |
| 55: | 129 | 170 | 162 | 105 | 46  |
| 60: | 4   | 0   | 0   | 0   | 0   |
| 65: | 0   | 0   | 0   | 0   | 0   |
| 70: | 0   | 0   | 0   | 0   | 0   |
| 75: | 0   | 0   | 0   | 0   | 0   |
| 80: | 0   | 0   | 0   | 0   | 0   |
| 85: | 0   | 0   | 0   | 0   | 0   |
| 90: | 0   | 0   | 0   | 0   | 0   |
| 95: | 0   | 0   | 0   | 0   | 0   |

TABLE 2

```
10   REM ************ DIST10 **************
20   OPEN "FIG4.TBL" FOR OUTPUT AS #1
30   THR = 2048
40   INPUT "OFFSET";OFFSET
50   TICK = 4
60   ZTICK = 1/6
70   DIM DTBL(100)
80   ZPER(0) = 1000/61
90   ZPER(1) = 1000/38
100      ZCNT(0) = INT(ZPER(0)/ZTICK) + OFFSET
110      ZCNT(1) = INT(ZPER(1)/ZTICK) + OFFSET
120      FOR J = 0 TO 40
130   DIT = 0
140   FOR I = 0 TO INT(ZPER(1))
150         ATME = (1 −J/40)*TICK
160         ZCNT = ZCNT(0)
170         DIT = DIT + 1
180         ACC = 16*ZCNT(1)
190         ZINT = DIT + (1 − DIT/ZPER(1))*ZPER(0)
200         ATME = ATME + TICK
210         IF (ATME < ZINT) THEN GOTO 200
220         ZCNT = INT(ZINT/ZTICK) + OFFSET
230         ACC = ACC − ZCNT(1) + ZCNT
240         ATME = ATME + TICK
250         IF (ACC <= THR) THEN GOTO 310
260         IF (ATME <= (ZINT + ZPER(0))) GOTO 230
270         ZCNT = ZCNT(0)
280         ACC = ACC −ZCNT(1) + ZCNT
290         ATME = ATME + TICK
300         IF (ACC > THR) GOTO 280
310         DELAY = INT(ATME − DIT + .5)
320         DTBL(DELAY) = DTBL(DELAY) + 1
330   NEXT I
340   NEXT J
```

TABLE 2-continued

| | |
|---|---|
| 350 | CLS |
| 360 | SCREEN 2,0 |
| 370 | KEY OFF |
| 380 | FOR I = 0 TO 99 |
| 390 | LINE (5*I,150) — (5*I,150 − DTBL(I)/2) |
| 400 | LINE (5*I + 1,150) — (5*I + 1,150 − DTBL(I)/2) |
| 410 | LINE (5*I + 2,150) — (5*I + 2,150 − DTBL(I)/2) |
| 420 | LINE (5*i + 3,150) — (5*I + 3,150 − DTBL(I)/2) |
| 430 | NEXT I |
| 440 | FOR I = 1 TO 10 |
| 450 | PSET(50*I − 5,153) |
| 460 | NEXT I |
| 470 | LOCATE 22 |
| 480 | STOP |
| 490 | SCREEN 0,0,0 |
| 500 | FOR I = 0 TO 19 |
| 510 | VAR = 5*I |
| 520 | PRINT #1," ",VAR; |
| 530 | FOR J = 0 TO 4 |
| 540 | VAR1 = 5*I + J |
| 550 | PRINT #1,DTBL(VAR1), |
| 560 | NEXT J |
| 570 | PRINT #1, " " |
| 580 | NEXT I |

TABLE 4

| | |
|---|---|
| 10 | REM *********** DIST01 ************** |
| 20 | OPEN "FIG7.TBL" FOR OUTPUT AS #1 |
| 30 | THR = 2048 |
| 40 | INPUT"OFFSET";OFFSET |
| 50 | TICK = 4 |
| 60 | ZTICK = 1/6 |
| 70 | DIM DTBL(100) |
| 80 | ZPER(0) = 1000/61 |
| 90 | ZPER(1) = 1000/38 |
| 100 | ZCNT(0) = INT(ZPER(0)/ZTICK) + OFFSET |
| 110 | ZCNT(1) = INT(ZPER(1)/ZTICK) + OFFSET |
| 120 | FOR J = 0 TO 40 |
| 130 |    DIT = 0 |
| 140 |    FOR I = 0 TO INT(ZPER(0)) |
| 150 |       ATME = (1 −J/40)*TICK |
| 160 |       ZCNT = ZCNT(0) + OFFSET |
| 170 |       DIT = DIT + 1 |
| 180 |       ACC = 16*ZCNT(0) |
| 190 |       ZINT = DIT + (1 − DIT/ZPER(0))*ZPER(1) |
| 200 |       ATME = ATME + TICK |
| 210 |       IF (ATME < ZINT) THEN GOTO 200 |
| 220 |       ZCNT = INT(ZINT/ZTICK) + OFFSET |
| 230 |       ACC = ACC − ZCNT(0) + ZCNT |
| 240 |       ATME = ATME + TICK |
| 250 |       IF (ACC >= THR) THEN GOTO 310 |
| 260 |       IF (ATME <= (ZINT + ZPER(1))) GOTO 230 |
| 270 |       ZCNT = ZCNT(1) + OFFSET |
| 280 |       ACC = ACC − ZCNT(0) + ZCNT |
| 290 |       ATME = ATME + TICK |
| 300 |       IF (ACC < THR) GOTO 280 |
| 310 |       DELAY = INT(ATME − DIT + .5) |
| 320 |       DTBL(DELAY) = DTBL(DELAY) + 1 |
| 330 |    NEXT I |
| 340 | NEXT J |
| 350 | CLS |
| 360 | SCREEN 2,0 |
| 370 | KEY OFF |
| 380 | FOR I = 0 TO 99 |
| 390 | LINE (5*I,150) — (5*I,150 − DTBL(I)/2) |
| 400 | LINE (5*I + 1,150) — (5*I + 1,150 − DTBL(I)/2) |
| 410 | LINE (5*I + 2,150) — (5*I + 2,150 − DTBL(I)/2) |
| 420 | LINE (5*i + 3,150) — (5*I + 3,150 − DTBL(I)/2) |
| 430 | NEXT I |
| 440 | FOR I = 1 TO 10 |
| 450 | PSET(50*I − 5,153) |
| 460 | NEXT I |
| 470 | LOCATE 22 |
| 480 | STOP |
| 490 | SCREEN 0,0,0 |
| 500 | FOR I = 0 TO 19 |
| 510 | VAR = 5*I |
| 520 | PRINT #1, VAR; |
| 530 | FOR J = 0 TO 4 |
| 540 | VAR1 = 5*I + J |

TABLE 4-continued

| | |
|---|---|
| 550 | PRINT #1, DTBL(VAR1), |
| 560 | NEXT J |
| 570 | NEXT I |
| 580 | CLOSE #1 |

TABLE 5

| | |
|---|---|
| 10 | BRATE = 9.600001 |
| 20 | TICK = 4 |
| 30 | ZTICK = 1/6 |
| 40 | PH = 12 |
| 50 | SMPLS = 100 |
| 60 | DIM ZTBL(SMPLS) |
| 70 | DIM DTBL(600) |
| 80 | DIM ATBL(SMPLS) |
| 90 | DIM ACCTBL(600) |
| 100 | ACC = 16*98 |
| 110 | ZPER(0) = 16.393 |
| 120 | ZPER(1) = 26.316 |
| 130 | ZCNT(0) = INT(ZPER(0)/ZTICK) |
| 140 | ZCNT(1) = INT(ZPER(1)/ZTICK) |
| 150 | DVALI = 27 |
| 160 | DVAL = DVALI |
| 170 | BPER = 1000/BRATE |
| 180 | BTME = BPER |
| 190 | D = 0 |
| 200 | NXD = 1 |
| 210 | FOR I = 1 TO SMPLS |
| 220 |    DTBL(I) = ATME |
| 230 |    IF (ZPER(D) > BTME) THEN GOTO 240 ELSE GOTO 330 |
| 240 |       R = BTME/ZPER(D) |
| 250 |       ZINT = R*ZPER(D) + (1 − R)*ZPER(NXD) |
| 260 |       D = NXD |
| 270 |       NXD1 = (DVAL AND 64)/64 |
| 280 |       NXD2 = (DVAL AND 32)/32 |
| 290 |       NXD = NXD1 XOR NXD2 |
| 300 |       DVAL = (DVAL*2 + NXD) MOD 128 |
| 310 |       BTME = BTME + BPER |
| 320 |       GOTO 340 |
| 330 |    ZINT = ZPER(D) |
| 340 |    ATME = ATME + ZINT |
| 350 |    ATBL(I) = ATME |
| 360 |    BTME = BTME − ZINT |
| 370 |    ZTBL(I) = INT(ZINT/ZTICK) |
| 380 |    ZTME = ZINT |
| 390 | NEXT I |
| 400 | FIN = 16 |
| 410 | DIM FIFO(FIN) |
| 420 | FOR I = 0 TO 15 |
| 430 |    FIFO(I) = 98 |
| 440 | NEXT I |
| 450 | ATBL(0) = 0 |
| 460 | ZTBL(0) = 16.913 |
| 470 | TPTR = 1 |
| 480 | TME = 0 |
| 490 | TPTR = 1 |
| 500 | FPTR = 0 |
| 510 | TPTR = TPTR + 1 |
| 520 | NVAL = ZTBL(TPTR) |
| 530 | NSMPLS = INT(ATBL(SMPLS)/TICK) |
| 540 | FOR I = 1 TO NSMPLS |
| 550 |    TME = TME + TICK |
| 560 |    IF (TME <= ATBL(TPTR)) THEN GOTO 580 |
| 570 |       TPTR = TPTR + 1 |
| 580 |    NFIFO = ZTBL(TPTR − 1) |
| 590 |    ACC = ACC − FIFO(FPTR) + NFIFO |
| 600 |    ACCTBL(I) = ACC |
| 610 |    FIFO(FPTR) = NFIFO |
| 620 |    FPTR = (FPTR + 1) MOD 16 |
| 630 | NEXT I |
| 640 | DVAL = DVALI |
| 650 | D = 0 |
| 660 | NXD = 1 |
| 670 | BTME = 1000/BRATE |
| 680 | FOR I = 1 TO NSMPLS |
| 690 |    DTBL(l) = D |
| 700 |    BTME = BTME − TICK |
| 710 |    IF (BTME > 0) THEN GOTO 780 |
| 720 |       BTME = BTME + 1000/BRATE |
| 730 |       D = NXD |

TABLE 5-continued

| | |
|---|---|
| 740 | NXD1 = (DVAL AND 64)/64 |
| 750 | NXD2 = (DVAL AND 32)/32 |
| 760 | NXD = NXD1 XOR NXD2 |
| 770 | DVAL = (2*DVAL + NXD) MOD 128 |
| 780 | NEXT I |
| 790 | CLS |
| 800 | SCREEN 2,0 |
| 810 | KEY OFF |
| 820 | PSET(0,98) |
| 830 | FOR I = 16 TO NSMPLS |
| 840 | Y = INT(ACCTBL(I)/16) |
| 850 | PSET (I,Y) |
| 860 | PSET(I,113 + 30*DTBL(I − PH)) |
| 861 | IF (DTBL(I − PH −1) = DTBL(I − PH)) THEN GOTO 870 |
| 862 | FOR J = 0 TO 30 |
| 863 | PSET(I,113 + J) |
| 864 | NEXT J |
| 870 | IF ((I AND 6) = 0) THEN PSET(I,128) |
| 880 | NEXT I |
| 890 | LOCATE 22,20 |
| 900 | V = INT(10*BRATE) |
| 910 | V = V/10 |
| 920 | PRINT" RESPONSE FOR ";V;" KILOBAUD" |

I claim:

1. An FSK transmitter for transmitting an FSK signal comprising:

an accumulator;

an adder connected to said accumulator to add numbers thereto;

register means having a predetermined pair of numbers stored therein;

means for enabling one register from said register means;

a clock providing a frequency signal driving said accumulator to output a first and second frequency output signals; and means for feeding back said clock signal and a signal from said accumulator to said register means to enable said pair of numbers to be passed to said adder.

2. The FSK transmitter as set forth in claim 1, wherein said register means includes at least two registers each having a different predetermined pair of numbers stored therein and being responsive to an enable signal along with a binary HI/LO signal to transmit one or the other of said pair of numbers therefrom.

3. The FSK transmitter as set forth in claim 2, wherein said two registers each have a different pair of numbers stored therein and each being responsive to the enable signal and the binary HI/LO signal to transmit one of said pair of numbers to said adder.

4. The FSK transmitter as set forth in claim 1, wherein said feed back means includes a binary HI/LO signal derived from a combination of output signals from said accumulator and said clock signal connected to a shift register.

5. The FSK transmitter as set forth in claim 4, wherein said shift register has a first input from said accumulator and a second input from said clock and outputs a signal which is the opposite of the accumulator input delayed by one clock cycle.

6. The FSK transmitter as set forth in claim 5, wherein said binary HI/LO signal is derived from an AND gate having one input from said accumulator and a second input from said shift register.

* * * * *